(12) United States Patent
Pribula et al.

(10) Patent No.: US 8,482,398 B2
(45) Date of Patent: Jul. 9, 2013

(54) ELECTRONIC CONTROL CIRCUIT FOR LAMPS OF A VEHICLE

(75) Inventors: Dave Pribula, Wake Forest, NC (US); Evan J. Calarco, Schenectady, NY (US); Vincent Forte, Rensselaer, NY (US); Frank Santostefano, Valatie, NY (US)

(73) Assignee: Custom Dynamics LLC, Wake Forest, NC (US)

( * ) Notice: Subject to any disclaimer, the term of this patent is extended or adjusted under 35 U.S.C. 154(b) by 433 days.

(21) Appl. No.: 12/904,438

(22) Filed: Oct. 14, 2010

(65) Prior Publication Data

US 2012/0092151 A1 Apr. 19, 2012

(51) Int. Cl.
*B60Q 1/34* (2006.01)
(52) U.S. Cl.
USPC ........... 340/475; 340/463; 340/468; 340/471; 340/465
(58) Field of Classification Search
USPC ................. 340/463, 464, 465, 468, 469, 471, 340/475, 458; 362/473, 541, 485; 315/82, 315/83; 307/10.8
See application file for complete search history.

(56) References Cited

U.S. PATENT DOCUMENTS

| 3,337,846 | A | 8/1967 | Hollins |
| 4,723,095 | A | 2/1988 | Svazas et al. |
| 4,812,808 | A * | 3/1989 | Ulrich ........................... 340/468 |
| 6,483,246 | B2 * | 11/2002 | Sugimoto et al. ............... 315/82 |
| 7,619,511 | B2 | 11/2009 | Kesterson |
| 7,728,718 | B2 | 6/2010 | Takeuchi et al. |
| 2006/0002121 | A1 | 1/2006 | Weitzel |
| 2007/0040665 | A1* | 2/2007 | Scott ............................ 340/468 |
| 2007/0096893 | A1 | 5/2007 | Kondo |
| 2008/0232123 | A1* | 9/2008 | Onopa et al. ................... 362/485 |
| 2009/0190366 | A1* | 7/2009 | Weitzel ......................... 362/473 |

* cited by examiner

*Primary Examiner* — Brent Swarthout
(74) *Attorney, Agent, or Firm* — Coats & Bennett, PLLC

(57) ABSTRACT

An electronic control circuit controls a vehicle's lamp to selectively operate as a turning signal, emergency signal, or vehicle running lamp. Notably, the circuit permits the lamp to operate as an emergency signal lamp even when the vehicle is off. The circuit includes a supply circuit, a control circuit, and a disrupt circuit. The supply circuit supplies voltage to the lamp if either or both of a vehicle running signal and a flash signal have a first input value. Meanwhile, the control circuit generates a control signal having a first control value if the vehicle running signal and the flash signal have different values, and a second control value if the signals have the same value. The disrupt circuit then connects the lamp to ground if the control signal has the first control value, but disrupts that connection if the control signal has the second control value.

12 Claims, 5 Drawing Sheets

ELECTRONIC CONTROL CIRCUIT FOR LAMPS OF A VEHICLE

TECHNICAL FIELD

The present invention relates generally to control of a vehicle's lamps, and particularly relates to control of a vehicle's turning signal lamps to also operate as emergency signal and vehicle running lamps.

BACKGROUND

Various lamps mounted externally on a motor vehicle convey important information to pedestrians and drivers of other vehicles. In particular, lamps mounted on the sides of a vehicle, referred to as turning signal lamps, indicate which direction the vehicle is about to turn. When the driver is about to turn the vehicle left, for example, he or she activates the left turn signal switch, whereupon the lamp mounted on the left side of the vehicle flashes on and off; correspondingly, when the driver is about to turn the vehicle right, he or she activates the right turn signal switch, whereupon the lamp mounted on the right side of the vehicle flashes on and off.

When not being used to indicate which direction the vehicle is about to turn, the turning signal lamps may also operate as emergency signal lamps to indicate that the driver of the vehicle is in distress, or that the vehicle has been tampered with. In this case, the driver manually activates (or the vehicle's alarm system automatically activates) an emergency signal switch, whereupon both of the lamps flash on and off together.

Still further, the turning signal lamps may operate as vehicle running lights, to indicate the presence of the vehicle. That is, when not operating as turning signal lamps or emergency signal lamps, the lamps may constantly burn when the vehicle is in use, even during daylight hours, to enhance the visibility of the vehicle. This enhanced visibility proves particularly advantageous for smaller vehicles, such as motorcycles, that are often overlooked by other drivers.

Using the same lamps to serve multiple purposes in this way is often preferred over having separate, dedicated lamps for each purpose, but the multi-purpose use complicates the vehicle's lighting control system. Some control systems, for instance, require large arrangements of transistors and other components, which is problematic for the smaller vehicles that have a particular need for enhanced visibility. Other control systems that are well suited for smaller vehicles nonetheless fail to provide desired functionality, e.g., to permit operation of the lamps as emergency signal lamps while the vehicle is off or otherwise not in use.

SUMMARY

Teachings herein advantageously include an electronic control circuit for a lamp of a vehicle that is not only well suited for smaller vehicles (e.g., motorcycles), but also provides functionality absent from prior approaches. In particular, the circuit controls the lamp of a vehicle to selectively operate as a turning signal, emergency signal, or vehicle running lamp, and permits the lamp to operate as an emergency signal lamp even when the vehicle is off or otherwise not in use.

More particularly, the electronic control circuit includes a supply circuit. The supply circuit is configured to supply a power source voltage (e.g., 12 Volts) to the lamp in certain instances, depending on the value of a vehicle running signal and a flash signal.

In this regard, the vehicle running signal in some embodiments has a first input value if the vehicle is in use (e.g., if the vehicle's ignition is engaged); otherwise, the vehicle running signal has a second input value. The flash signal, by contrast, intermittently alternates between having the first and second input values if either the vehicle's turning signal switch or the vehicle's emergency signal switch is activated; otherwise, the flash signal has the second input value. With the signals defined in this way, the supply circuit is configured to supply voltage to the lamp if either or both of the vehicle running signal and the flash signal have the first input value. Of course that the supply circuit supplies voltage to the lamp is necessary but not sufficient for the lamp to turn on; the lamp must also be connected to ground in order for current to flow through it.

Accordingly, the electronic control circuit also includes a control circuit and a disrupt circuit. The control circuit is configured to generate a control signal which controls the disrupt circuit. Specifically, the control circuit generates the control signal to have a first control value if the vehicle running signal and the flash signal have different values, and to generate the control signal to have a second control value if the vehicle running signal and the flash signal have the same value. Responsive to this control signal, the disrupt circuit is configured to connect the lamp to ground if the control signal has the first control value, but to disrupt that connection if the control signal has the second control value.

Thus, even if the vehicle is turned off or otherwise no longer in use, the lamp may still flash on and off, e.g., to operate as an emergency signal lamp. Indeed, the vehicle running signal in this case is maintained to have the second input value, while the flash signal intermittently alternates between the first and second input values. Accordingly, the supply circuit intermittently supplies voltage to the lamp, and the disrupt circuit intermittently connects the lamp to ground. That is, when the flash signal has the second input value, the supply circuit does not supply voltage to the lamp and the disrupt circuit disrupts the lamp's connection to ground. Conversely, when the flash signal has the first input value, the supply circuit supplies voltage to the lamp and the disrupt circuit connects the lamp to ground. The lamp thus flashes on and off to operate as an emergency signal lamp even if the vehicle is turned off or otherwise not in use.

Of course other embodiments are also described herein, including a method of controlling a lamp of a vehicle. The present invention is therefore not limited to the above features, advantages, contexts or examples, and those familiar with electronic control circuits will recognize additional features and advantages upon reading the following detailed description and upon viewing the accompanying drawings.

DETAILED DESCRIPTION

Figure 1:
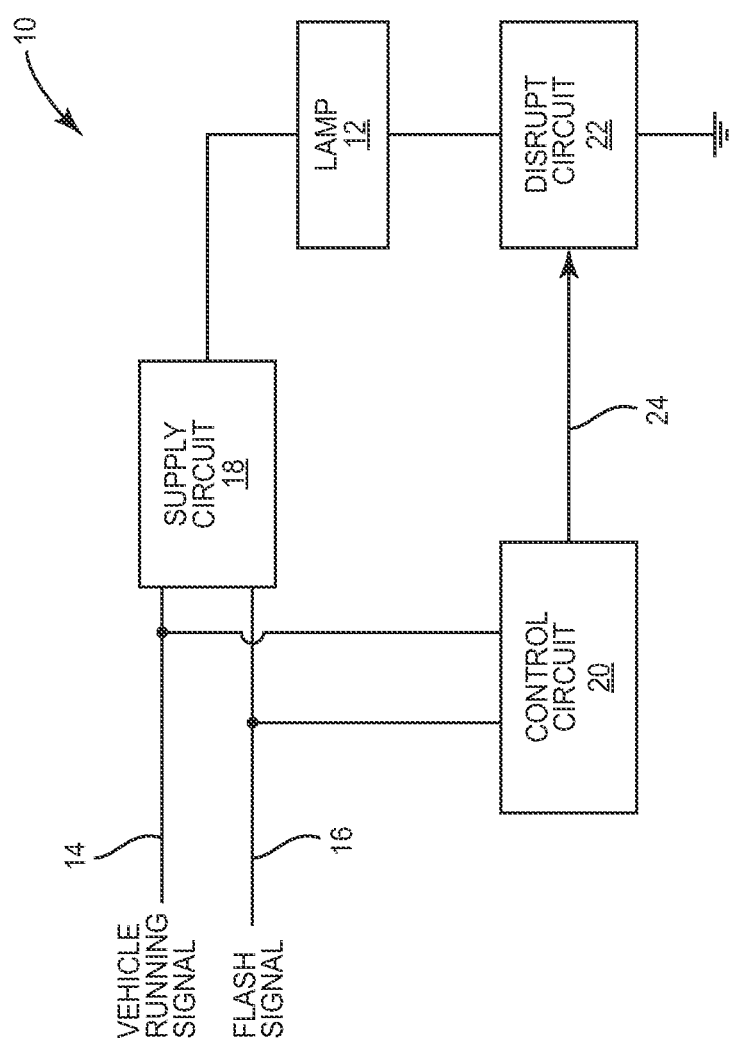
FIG. 1 is a block diagram of an electronic control circuit configured to control a lamp of a vehicle according to various embodiments of the present invention.

FIG. 1 shows an electronic control circuit 10 configured to control a lamp 12 of a vehicle. The circuit 10 controls the lamp 12 to selectively operate as a turning signal lamp, an emergency signal lamp, or a vehicle running lamp. When the circuit 10 controls the lamp 12 to operate as a vehicle running lamp, the lamp 12 burns steadily. Conversely, when the circuit 10 controls the lamp 12 to operate as a turning signal lamp or as an emergency signal lamp, the lamp 12 intermittently flashes on and off.

Correspondingly, the electronic control circuit 10 is responsive to a vehicle running signal 14 and a flash signal 16. In particular, the circuit 10 includes a supply circuit 18 that is configured to supply a power source voltage (e.g., 12 Volts) to the lamp 12 if either or both of the vehicle running signal 20 and the flash signal 22 have a first input value. That the supply circuit 14 supplies voltage to the lamp 12 in these cases is, of course, necessary but not sufficient for the lamp 12 to turn on; the lamp 12 must also be connected to ground in order for current to flow through it.

In this regard, the circuit 10 also includes a control circuit 20 and a disrupt circuit 22. The control circuit 20 is configured to generate a control signal 24 which controls the disrupt circuit 22. Specifically, the control circuit 20 generates the control signal 24 to have a first control value if the vehicle running signal 14 and the flash signal 16 have different values. The control circuit 20 generates the control signal 24 to have a second control value if the vehicle running signal 14 and the flash signal 16 have the same value. Responsive to this control signal 24, the disrupt circuit 22 is configured to connect the lamp 12 to ground if the control signal 24 has the first control value, but to disrupt that connection if the control signal 24 has the second control value.

Accordingly, in the case that both the vehicle running signal 14 and the flash signal 16 have the first input value, the lamp 12 does not turn on because although the supply circuit 18 supplies voltage to the lamp 12, the control circuit 20 generates the control signal 24 to have the second control value and the disrupt circuit 22 correspondingly disrupts the lamp's connection to ground. On the other hand, in the case that one of the signals 14, 16 has the first input value and the other signal 16, 14 has a different value, the lamp 12 does turn on because the supply circuit 18 supplies voltage to the lamp 12, the control circuit 20 generates the control signal 24 to have the first control value, and the disrupt circuit 22 correspondingly connects the lamp 12 to ground.

So configured, the circuit 10 is particularly well suited for controlling the lamp 12 to selectively operate as a turning signal lamp, an emergency signal lamp, or a vehicle running lamp. In some embodiments, for example, the vehicle running signal 14 has the first input value if the vehicle is in use (e.g., if the vehicle's ignition is engaged, or if the vehicle is in an ON state whereby although the ignition is not engaged, power is applied to the vehicle). Otherwise, the vehicle running signal 14 has a second input value that is different from the first input value.

The flash signal 16, by contrast, may intermittently alternate between having the first and second input values in some instances. This may occur if the vehicle's turning signal switch corresponding to the lamp 12 is activated, or if the vehicle's emergency signal switch is activated. For example, if the lamp 12 is to operate as the left turning signal lamp, and the vehicle's left turning signal switch is activated, the flash signal 16 intermittently alternates between having the first and second input values. Or, even if the vehicle's left turning signal switch is not activated, the flash signal 16 nonetheless intermittently alternates between having the first and second input values if the vehicle's emergency signal switch is activated. Otherwise, however, the flash signal 16 has the second input value, e.g., as its steady default value.

Thus, in the case that the vehicle is not in use, and neither the vehicle's turning signal switch nor emergency signal switch are activated, both the vehicle running signal 14 and the flash signal 16 are steadily maintained to have the second input value. The supply circuit 18 does not supply voltage to the lamp 12, and the disrupt circuit 22 disconnects the lamp's connection to ground; the lamp 12 does not turn on.

In another case, where the vehicle's turning signal switch and emergency signal switch are still not activated, but the vehicle is now in use, the vehicle running signal 14 is steadily maintained to have the first input value while the flash signal 16 is steadily maintained to have the second input value. Thus, the supply circuit 18 supplies voltage to the lamp 12 because the vehicle running signal 14 has the first input value, and the disrupt circuit 22 maintains the lamp's connection to ground because the signals 14, 16 have different values; the lamp 12 stays on to operate as a vehicle running lamp.

If the vehicle's turning signal switch or emergency signal switch are then activated, while the vehicle is still in use, the vehicle running signal 14 is maintained to have the first input value, but the flash signal 16 intermittently alternates between the first and second input values. The supply circuit 18 continues to supply voltage to the lamp 12 throughout this alternation, since the vehicle running signal 14 is maintained to have the first input value. However, the disrupt circuit 22 intermittently alternates between connecting the lamp's connection to ground and disrupting that connection because alternation of the flash signal 16 results in alternation of the signals 14, 16 having and not having the same values; the lamp 12 thus flashes on and off to operate as a turning signal lamp or emergency signal lamp.

Notably, even if the vehicle is then turned off or otherwise no longer in use, the lamp 12 still flashes on and off, e.g., to operate as an emergency signal lamp. In this case, the vehicle running signal 14 is maintained to have the second input value, while the flash signal 16 intermittently alternates between the first and second input values. Accordingly, the supply circuit 18 intermittently supplies voltage to the lamp 12, and the disrupt circuit 22 intermittently connects the lamp 12 to ground. That is, when the flash signal 16 has the second input value, the supply circuit 18 does not supply voltage to the lamp 12 and the disrupt circuit disrupts the lamp's connection to ground. Conversely, when the flash signal 16 has the first input value, the supply circuit 18 supplies voltage to the lamp 12 and the disrupt circuit connects the lamp 12 to ground. The lamp 12 thus flashes on and off to operate as an emergency signal lamp even if the vehicle is turned off or otherwise not in use.

Figure 2:
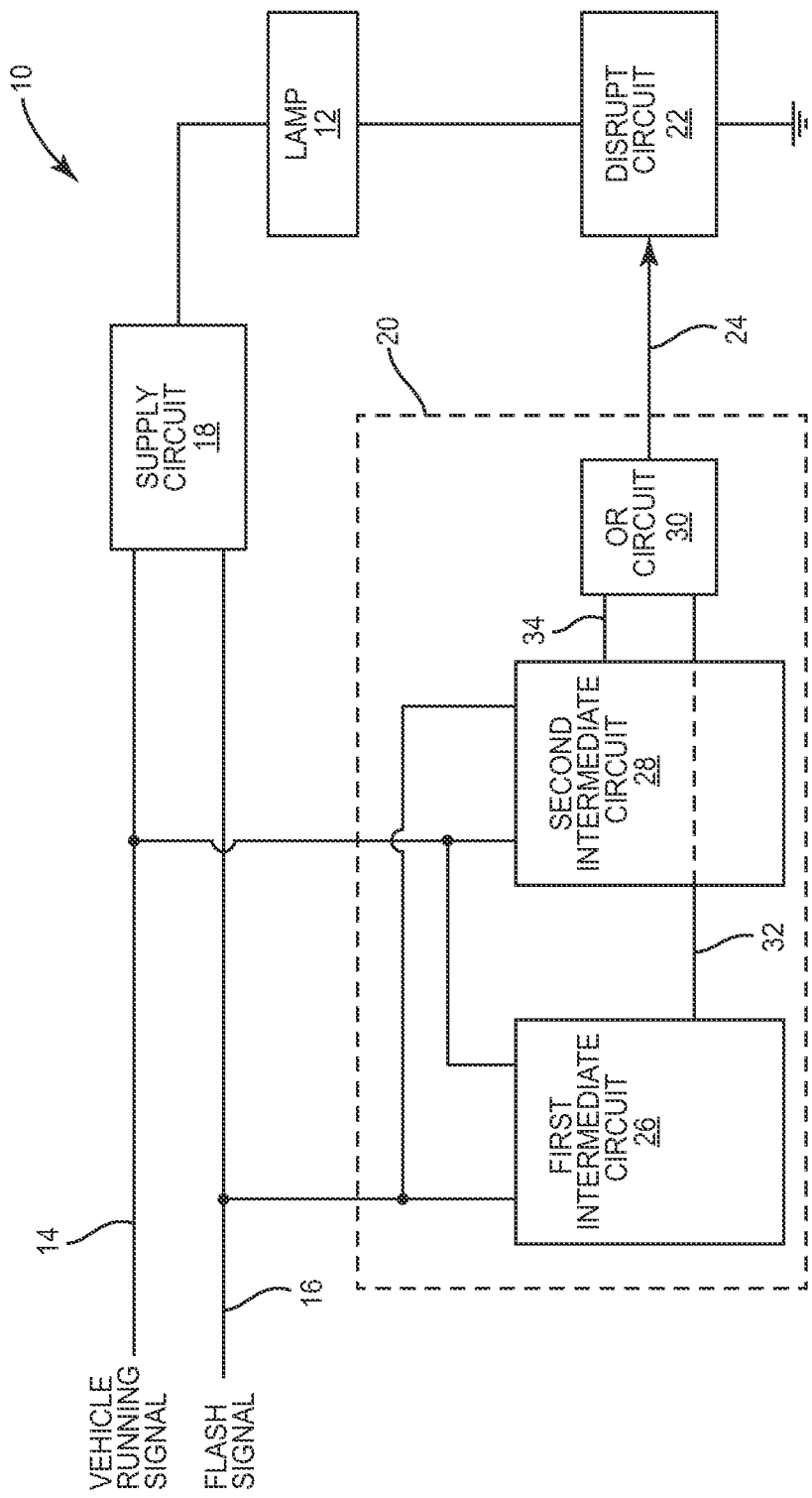
FIG. 2 is a block diagram of an electronic control circuit, illustrating the control circuit as including first and second intermediate circuits according to some embodiments.

FIG. 2 illustrates additional details of the control circuit 20 according to some embodiments. In FIG. 2, the control circuit 20 includes a first intermediate circuit 26, a second intermediate circuit 28, and an OR circuit 30. The first intermediate circuit 26 is configured to generate a first intermediate signal 32, the second intermediate circuit 28 is configured to generate a second intermediate signal 34, and the OR circuit is configured to generate the control signal 24 based on those intermediate signals 32, 34.

More particularly, the first intermediate circuit 26 is configured to generate the first intermediate signal 32 to have a first intermediate value if the vehicle running signal 14 has the first input value and the flash signal 16 has the second input value. Otherwise, the first intermediate circuit 26 generates the first intermediate signal 32 to have a second intermediate value that is different from the first.

Likewise, the second intermediate circuit 28 is configured to generate the second intermediate signal 34 to have the first intermediate value if the flash signal 16 has the first input value and the vehicle running signal 14 has the second input value. Otherwise, the second intermediate circuit 28 generates the second intermediate signal 34 to have the second intermediate value.

Finally, the OR circuit 30 is configured to generate the control signal 24 to have the first control value if either or both of the first and second intermediate signals 32, 34 have the first intermediate value (although, as described above, only one of the signals 32, 34 will have the first intermediate value at any given time). Otherwise, the OR circuit 30 generates the control signal 24 to have the second control value. The control circuit 20 thus generates the control signal 24 as described previously; that is, the signal 24 has the first control value if the vehicle running signal 14 and the flash signal 16 have different values, but has the second control value if the signals 14, 16 have the same value.

The values discussed above, in some embodiments, are voltages. The vehicle running signal 14 and the flash signal 16 may have, for example, a first input value of approximately 12 Volts or a second input value of approximately 0 Volts. These specific voltages are, of course, non-limiting, and in general the first input value may simply comprise a relatively high voltage and the second input value may comprise a relatively low voltage. The same can be said of the other values. That is, the first intermediate value and the first control value may comprise relatively high voltages and the second intermediate value and the second control value may comprise relatively low voltages, respectively.

Figure 3:
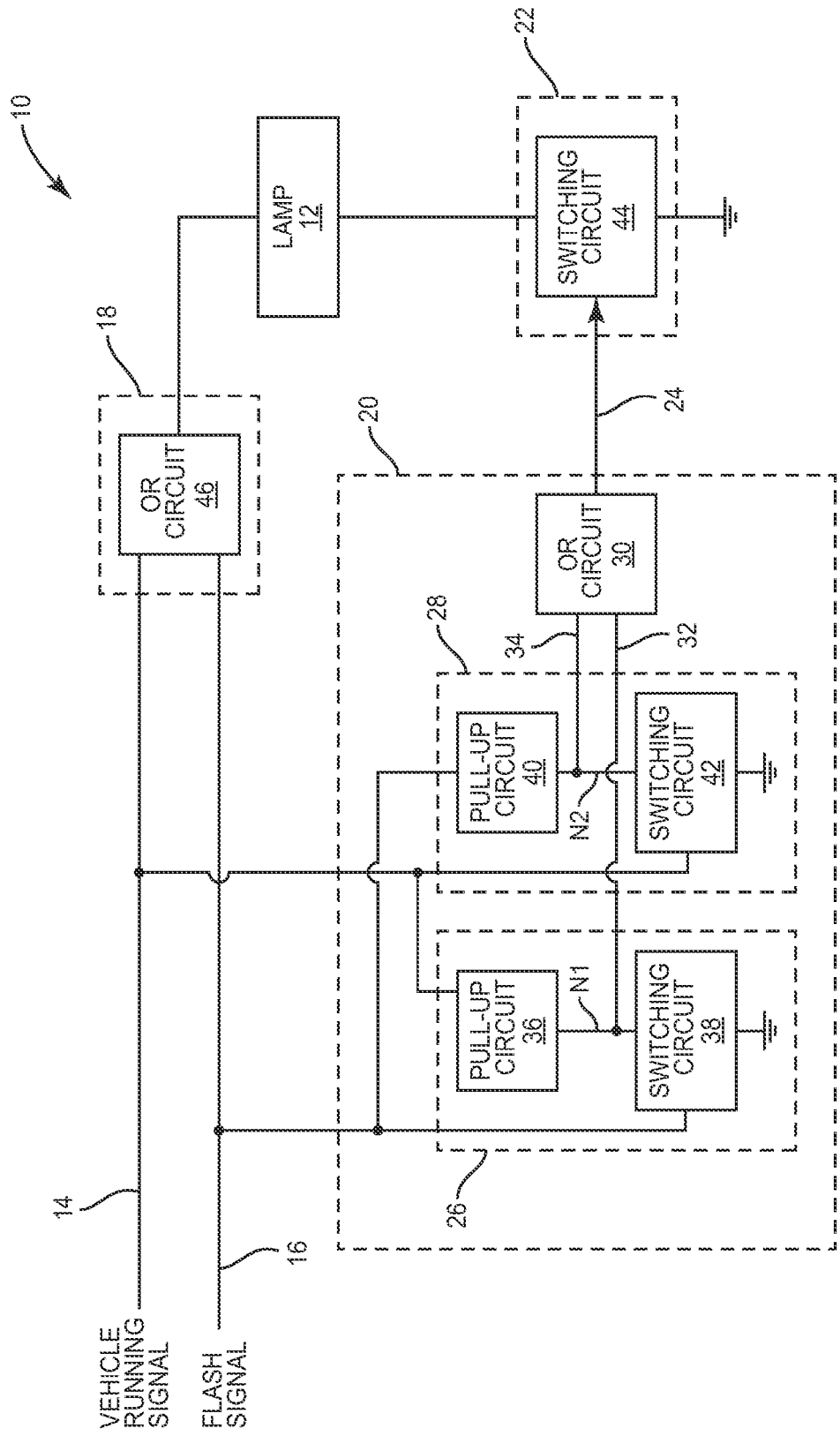
FIG. 3 is a block diagram of an electronic control circuit, illustrating additional details of an intermediate circuit according to some embodiments.

FIG. 3 illustrates an example of the control circuit 20 in such embodiments. In FIG. 3, the first intermediate circuit 26 includes a first pull-up circuit 36 and a first switching circuit 38, with a first node N1 between those circuits 36, 38 being associated with the first intermediate signal 32. Likewise, the second intermediate circuit 28 includes a second pull-up circuit 40 and a second switching circuit 42, with a second node N2 between those circuits 40, 42 being associated with the second intermediate signal 34.

With respect to the first intermediate circuit 26, the first pull-up circuit 36 is configured to pull the voltage of the first node N1 up to the first intermediate value if the vehicle running signal 14 has the first input value and the first switching circuit 38 is not activated. In this regard, the first switching circuit 38 is activated by the flash signal 16 having the first input value. Thus, the first pull-up circuit 36 pulls the voltage of the first node N1 up to the first intermediate value if the vehicle running signal 14 has the first input value and the flash signal 16 has the second input value such that the first switching circuit 38 is not activated. Otherwise, when the first switching circuit 38 is activated, the circuit 38 connects the first node N1 to ground and thereby pulls the voltage of the node N1 down to the second intermediate value.

In an analogous manner, the second pull-up circuit 40 is configured to pull the voltage of the second node N2 up to the first intermediate value if the flash signal 16 has the first input value and the second switching circuit 42 is not activated. In this regard, the second switching circuit 42 is activated by the vehicle running signal 14 having the first input value. Thus, the second pull-up circuit 40 pulls the voltage of the second node N2 up to the first intermediate value if the flash signal 16 has the first input value and the vehicle running signal 14 has the second input value such that the second switching circuit 42 is not activated. Otherwise, when the second switching circuit 42 is activated, the circuit 42 connects the second node N2 to ground and thereby pulls the voltage of the node N2 down to the second intermediate value.

When either node N1 or N2 is pulled up to the first intermediate value, the OR circuit 30 generates the control signal 24 to have the first control value. The OR circuit 30 may also be nominally configured to generate the control signal 24 to have the first control value if both nodes N1, N2 have the first intermediate value, but as described above such scenario will not occur. In any event, if neither node N1 nor N2 is pulled up to the first intermediate value, meaning that they are both pulled down to the second intermediate value, the OR circuit 30 generates the control signal 24 to have the second control value.

As shown in FIG. 3, the disrupt circuit 22 may also comprise a switching circuit 44. This switching circuit 44 is activated by the control signal 24 having the first control value. When this occurs, the switching circuit 44 is configured to connect the lamp 12 to ground, and thereby turn on the lamp 12 if the supply circuit 18 is supplying voltage to the lamp 12.

In this regard, the supply circuit 18 in FIG. 3 comprises an OR circuit 46. The OR circuit 46 is configured to supply the power source voltage to the lamp 12 if either or both of the vehicle running signal 14 and the flash signal 16 have the first input value.

Figure 4:
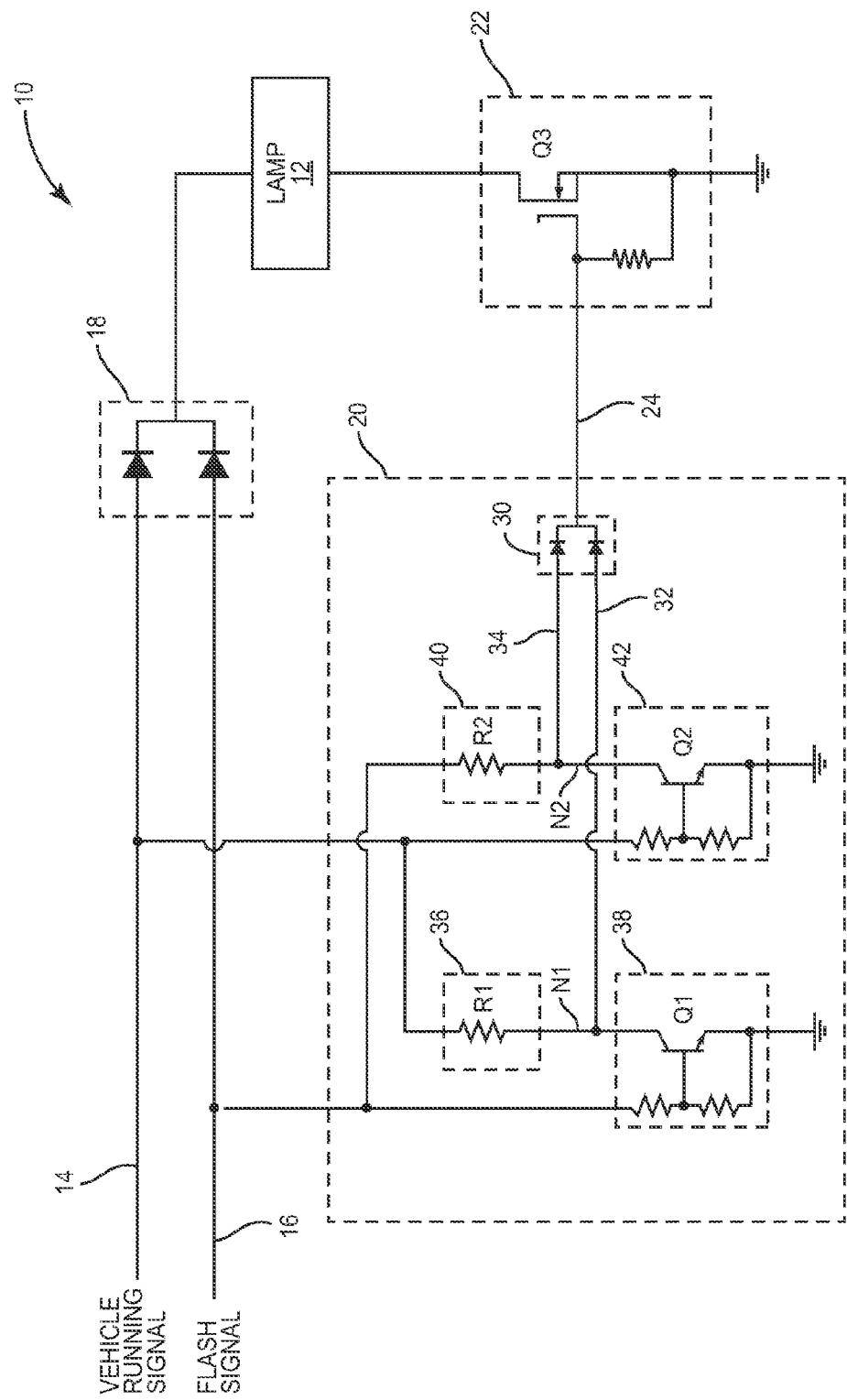
FIG. 4 is a block diagram of an electronic control circuit, illustrating a particular implementation of the circuit according to some embodiments.

FIG. 4 illustrates one implementation of the supply circuit 18, control circuit 20, and disrupt circuit 22 according to the above embodiments. In FIG. 4, the supply circuit 18 simply comprises a pair of diodes with a common output node. If either the vehicle running signal 14 or the flash signal 16 has the first input value, which in these embodiments is a relatively high voltage, at least one of the diodes is forward biased and conducts. This of course supplies voltage to the lamp 12.

Also in FIG. 4, the first switching circuit 38 comprises an npn bi-polar junction transistor Q1 that has its base connected to the flash signal 16, its emitter connected to ground, and its collector connected to the first node N1 associated with the first intermediate signal 32. The first pull-up circuit 36 correspondingly comprises a first pull-up resistor R1 that is connected at one end to the vehicle running signal 14 and at the other end to the first node N1. For example, in embodiments where the first and second input values are 12 and 0 Volts, respectively, the first pull-up resistor R1 may comprise a 2.7 k Ohm resistor.

Likewise, the second switching circuit 42 comprises an npn bi-polar junction transistor Q2 that has its base connected to the vehicle running signal 14, its emitter connected to ground, and its collector connected to the second node N2 associated with the second intermediate signal 34. The second pull-up circuit 40 correspondingly comprises a second pull-up resistor R2 that is connected at one end to the flash signal 16 and at the other end to the second node N2. Again, in embodiments where the first and second input values are 12 and 0 Volts, respectively, the second pull-up resistor R2 may comprise a 2.7 k Ohm resistor.

Configured in this way, the OR circuit 30 may also comprise a pair of diodes with a common output node. If either the first or second intermediate signal 32, 34 has the first intermediate value, which in these embodiments is a relatively high voltage, at least one of the diodes is forward biased and conducts. This generates a control signal 24 with a relatively high voltage as well, defined as the first control value. Responsive to the relatively high voltage of the control signal

24, a third transistor Q3 (shown here as a depletion-mode NMOS device) in the disrupt circuit 22 turns on and connects the lamp 12 to ground.

Conversely, if both the first and second intermediate signal 32, 34 have the second intermediate value, which in these embodiments is a relatively low voltage, neither of the diodes is forward biased. This generates a control signal 24 with a relatively low voltage as well, defined as the second control value. Responsive to the relatively low voltage of the control signal 24, the third transistor Q3 in the disrupt circuit 22 turns off and thereby disrupts the lamp's connection to ground.

Those skilled in the art will of course appreciate that while the above embodiments have illustrated just one lamp 12 of a vehicle, the electronic control circuit 10 may in fact control additional lamps in an analogous manner. For example, the illustrated lamp 12 may be externally mounted on the left side of the vehicle, and an additional lamp not shown may be externally mounted on the right side of the vehicle. The left lamp 12 may be controlled as described above by the vehicle running signal 14 and the flash signal 16 (which is specific to the left lamp), while the right lamp may be controlled in a similar manner by the vehicle running signal 14 and an additional flash signal specific to the right lamp. If the vehicle's emergency signal switch is activated, both the flash signal 16 and the additional flash signal intermittently alternate between the first and second input values, to flash both lamps on and off together.

Thus, in some embodiments the electronic control circuit 10 further includes an additional supply circuit, an additional control circuit, and an additional disrupt circuit for controlling operation of an additional lamp. The additional supply circuit is configured to supply the power source voltage to the additional lamp if either or both of the vehicle running signal 14 and an additional flash signal have the first input value. Similarly, the additional control circuit is configured to generate an additional control signal having the first control value if the vehicle running signal 14 and the additional flash signal have different values, and the second control value if the vehicle running signal 14 and the additional flash signal have the same value. The additional disrupt circuit is meanwhile configured to connect the additional lamp to ground if the additional control signal has the first control value, but to disrupt that connection if the additional control signal has the second control value.

Those skilled in the art will also appreciate that no specific type of lamp 12 is required for practicing the invention. That is, the lamp 12 may comprise an incandescent bulb or, preferably, a plurality of light-emitting diodes (LEDs). In a particularly advantageous embodiment, for example, the lamp 12 comprises 48 high powered, wide angle LEDs that provide more light output and illuminate faster than an incandescent bulb. Furthermore, the electronic control circuit 10 maintains the lamp 12 at full intensity when operating as a vehicle running lamp in order to enhance the visibility of the vehicle during daytime hours. Likewise, the circuit 10 flashes the lamp 12 between zero intensity and full intensity when operating as a turning signal lamp or emergency signal lamp in order to enhance the visibility of the vehicle when turning or in distress.

Figure 5:
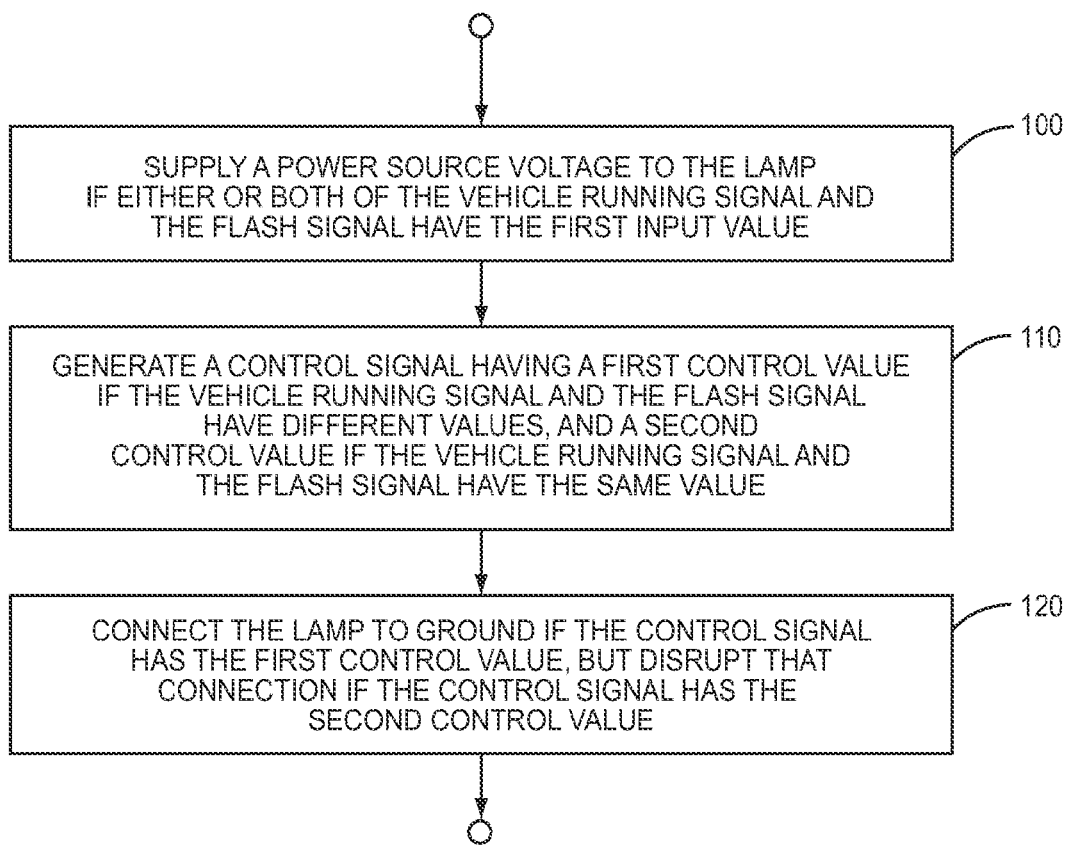
FIG. 5 is a logic flow diagram illustrating a method of controlling a lamp of a vehicle, according to various embodiments of the present invention.

With the above variations and modifications in mind, those skilled in the art will appreciate that the electronic control circuit 10 of the present invention generally performs the method illustrated in FIG. 5, in order to control the lamp 12 of a vehicle. In FIG. 5, the circuit 10 supplies a power source voltage to the lamp 12 if either or both of the vehicle running signal 14 and the flash signal 16 have the first input value (Block 100). The circuit 10 also generates a control signal 24 having a first control value if the vehicle running signal 14 and the flash signal 16 have different values, and a second control value if the vehicle running signal 14 and the flash signal 16 have the same value (Block 110). Finally, the circuit 10 connects the lamp 12 to ground if the control signal 24 has the first control value, but disrupts that connection if the control signal 24 has the second control value (Block 120).

Of course, the present invention may be carried out in other specific ways than those set forth without departing from the scope of the inventive techniques illustrated by specific embodiments illustrated herein. Thus, the present invention is not limited to the features and advantages detailed in the foregoing description, nor is it limited by the accompanying drawings.

What is claimed is:

1. An electronic control circuit configured to control a lamp of a vehicle to selectively operate as a turning signal lamp, an emergency signal lamp, or a vehicle running lamp, the circuit comprising:

a supply circuit configured to supply a power source voltage to the lamp if either or both of a vehicle running signal and a flash signal have a first input value;

a control circuit configured to generate a control signal having a first control value if the vehicle running signal and the flash signal have different values, and a second control value if the vehicle running signal and the flash signal have the same value; and a disrupt circuit configured to connect the lamp to ground if the control signal has the first control value, but to disrupt that connection if the control signal has the second control value wherein the control circuit comprises:

a first intermediate circuit configured to generate a first intermediate signal having a first intermediate value if the vehicle running signal has the first input value and the flash signal has a second input value different from the first input value, and a second intermediate value different from the first intermediate value otherwise;

a second intermediate circuit configured to generate a second intermediate signal having the first intermediate value if the flash signal has the first input value and the vehicle running signal has the second input value, and the second intermediate value otherwise; and an OR circuit configured to generate the control signal having the first control value if either or both of the first and second intermediate signals have the first intermediate value;

wherein the first input value, the first intermediate value, and the first control value comprise relatively high voltages and the second input value, the second intermediate value, and the second control value comprise relatively low voltages, respectively; and wherein the first intermediate circuit comprises a first pull-up circuit and a first switching circuit, wherein the first pull-up circuit is configured to pull the voltage of a first node associated with the first intermediate signal up to the first intermediate value if the vehicle running signal has the first input value and the first switching circuit is not activated, wherein the first switching circuit is activated by the flash signal having the first input value, and wherein the first switching circuit is configured to, when activated, connect the first node to ground and thereby pull the voltage of the first node down to the second intermediate value; and wherein the second intermediate circuit comprises a second pull-up circuit and a second switching circuit, wherein the second pull-up circuit is configured to pull the voltage of a second node associated with the second intermediate signal up to the first intermediate value if the flash signal has the first input value and the second switching circuit is not activated, wherein the second switching circuit is activated by the vehicle running signal having the first input value, and wherein the second switching circuit is configured to, when activated, connect the second node to ground and thereby pull the voltage of the second node down to the second intermediate value.

2. The electronic control circuit of claim 1, wherein the flash signal intermittently alternates between having the first input value and a second input value if either or both of a turning signal switch corresponding to the lamp and an emergency signal switch are activated, but otherwise has the second input value.

3. The electronic control circuit of claim 1, wherein the first switching circuit comprises an npn bi-polar junction transistor having its base connected to the flash signal, its emitter connected to ground, and its collector connected to the first node, and wherein the second switching circuit comprises an npn bi-polar junction transistor having its base connected to the vehicle running signal, its emitter connected to ground, and its collector connected to the second node.

4. The electronic control circuit of claim 1, wherein the first pull-up circuit comprises a first pull-up resistor connected at one end to the vehicle running signal and at the other end to the first node, and wherein the second pull-up circuit comprises a second pull-up resistor connected at one end to the flash signal and at the other end to the second node.

5. The electronic control circuit of claim 1, wherein the disrupt circuit comprises a switching circuit that is activated by the control signal having the first control value and that is configured to, when activated, connect the lamp to ground.

6. The electronic control circuit of claim 1, wherein the supply circuit comprises an OR circuit configured to supply the power source voltage to the lamp if either or both of the vehicle running signal and the flash signal have the first input value.

7. The electronic control circuit of claim 1, wherein the lamp comprises a plurality of light emitting diodes.

8. The electronic control circuit of claim 1, further comprising:
   an additional supply circuit configured to supply the power source voltage to an additional lamp if either or both of the vehicle running signal and an additional flash signal have the first input value;
   an additional control circuit configured to generate an additional control signal having the first control value if the vehicle running signal and the additional flash signal have different values, and the second control value if the vehicle running signal and the additional flash signal have the same value; and
   an additional disrupt circuit configured to connect the additional lamp to ground if the additional control signal has the first control value, but to disrupt that connection if the additional control signal has the second control value.

9. A method of controlling a lamp of a vehicle to selectively operate as a turning signal lamp, an emergency signal lamp, or a vehicle running lamp, the method comprising:
   supplying a power source voltage to the lamp if either or both of a vehicle running signal and a flash signal have a first input value;
   generating a control signal having a first control value if the vehicle running signal and the flash signal have different values, and a second control value if the vehicle running signal and the flash signal have the same value; and
   connecting the lamp to ground if the control signal has the first control value, but disrupting that connection if the control signal has the second control value
wherein generating said control signal comprises:
   generating a first intermediate signal having a first intermediate value if the vehicle running signal has the first input value and the flash signal has a second input value different from the first input value, and a second intermediate value different from the first intermediate value otherwise;
   generating a second intermediate signal having the first intermediate value if the flash signal has the first input value and the vehicle running signal has the second input value, and the second intermediate value otherwise; and
   generating the control signal having the first control value if either or both of the first and second intermediate signals have the first intermediate value;
wherein the first input value, the first intermediate value, and the first control value comprise relatively high voltages and the second input value, the second intermediate value, and the second control value comprise relatively low voltages, respectively,
wherein generating said first intermediate signal comprises:
   if the flash signal has the first input value, activating a first switching circuit configured to connect a first node associated with the first intermediate signal to ground and thereby pull the voltage of the first node down to the second intermediate value; and
   if the vehicle running signal has the first input value and the first switching circuit is not activated, pull the first node up to the first immediate value; and
wherein generating said second intermediate signal comprises:
   if the vehicle running signal has the first input value, activating a second switching circuit configured to connect a second node associated with the second intermediate signal to ground and thereby pull the voltage of the second node down to the second intermediate value; and
   if the flash signal has the first input value and the first switching circuit is not activated, pull the second node up to the first immediate value.

10. The method of claim 9, wherein the flash signal intermittently alternates between having the first input value and a second input value if either or both of a turning signal switch corresponding to the lamp and an emergency signal switch are activated, but otherwise has the second input value.

11. The method of claim 9, wherein the lamp comprises a plurality of light emitting diodes.

12. The method of claim 9, further comprising:
   supplying the power source voltage to an additional lamp if either or both of the vehicle running signal and an additional flash signal have the first input value;
   generating an additional control signal having the first control value if the vehicle running signal and the additional flash signal have different values, and the second control value if the vehicle running signal and the additional flash signal have the same value; and
   connecting the additional lamp to ground if the additional control signal has the first control value, but disrupting that connection if the additional control signal has the second control value.

* * * * *